US006393162B1

United States Patent
Higurashi

(10) Patent No.: US 6,393,162 B1
(45) Date of Patent: May 21, 2002

(54) IMAGE SYNTHESIZING APPARATUS

(75) Inventor: Masaki Higurashi, Hino (JP)

(73) Assignee: Olympus Optical Co., Ltd., TOkyo (JP)

( * ) Notice: Subject to any disclaimer, the term of this patent is extended or adjusted under 35 U.S.C. 154(b) by 0 days.

(21) Appl. No.: 09/223,434

(22) Filed: Dec. 30, 1998

(30) Foreign Application Priority Data

Jan. 9, 1998 (JP) .......................................... 10-002871

(51) Int. Cl.[7] .................................................. G06K 9/36
(52) U.S. Cl. ........................ 382/284; 345/629; 348/584
(58) Field of Search ................................ 382/284, 287, 382/294, 295, 173, 293, 300, 282; 345/629, 630; 348/584, 588, 501

(56) References Cited

U.S. PATENT DOCUMENTS

| | | | | |
|---|---|---|---|---|
| 5,880,778 A | * | 3/1999 | Alkagi | 348/218 |
| 5,982,951 A | * | 11/1999 | Katayama et al. | 382/284 |
| 5,991,461 A | * | 11/1999 | Schmucker et al. | 382/284 |
| 6,005,987 A | * | 12/1999 | Nakamura et al. | 382/294 |
| 6,205,259 B1 | * | 4/2001 | Komiya et al. | 382/284 |

FOREIGN PATENT DOCUMENTS

JP  09-93430  4/1997

OTHER PUBLICATIONS

"Virtual Camera System Using Panoramic Image", M. Hayashi et al, ITEC 1991 : 1991 ITE Annual Convention, pp. 385–386.

* cited by examiner

*Primary Examiner*—Leo Boudreau
*Assistant Examiner*—Yosef Kassa
(74) *Attorney, Agent, or Firm*—Frishauf, Holtz, Goodman, Langer & Chick, P.C.

(57) ABSTRACT

An image synthesizing apparatus is disclosed which incorporates a deviation detection portion for calculating a parameter indicating the positional relationship between images obtained by photographing a subject such that the subject is divided into sections, an interpolating portion for correcting parallel translation and rotation from the parameter and the images, an exposure processing portion which calculates an exposure correction coefficient from overlap portions of the images corrected by the interpolating portion so as to correct the exposure of the images which must be connected to each other, and an image synthesizing portion for connecting and synthesizing the corrected images to one another, wherein the exposure of each image is corrected before the divided and photographed images are connected to one another so that the overall image is corrected to have natural exposure.

6 Claims, 16 Drawing Sheets

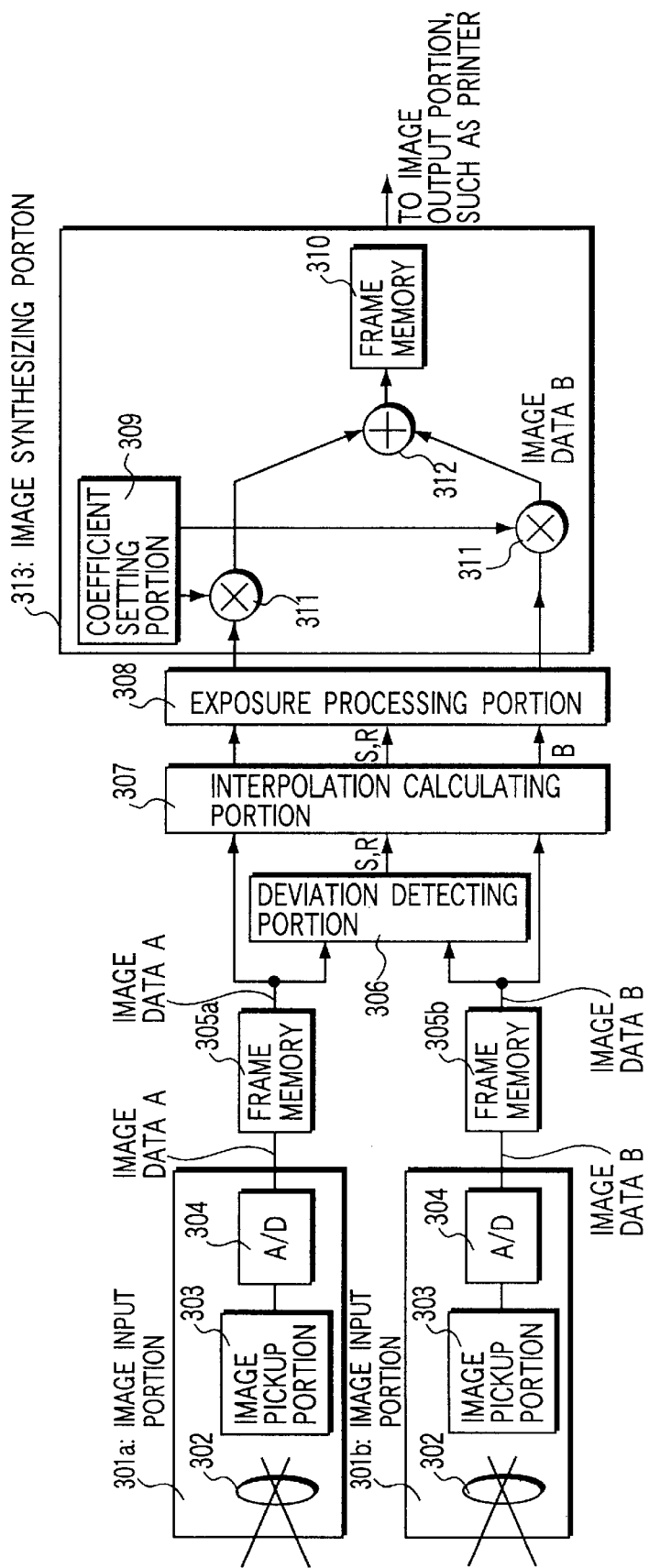
F I G. 10

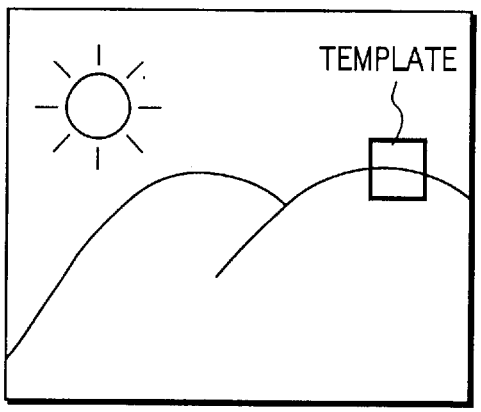
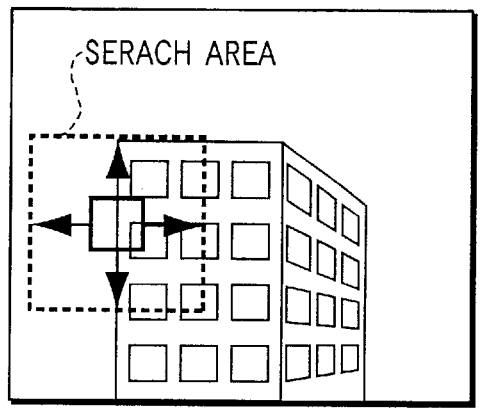
FIG. 12A    FIG. 12B
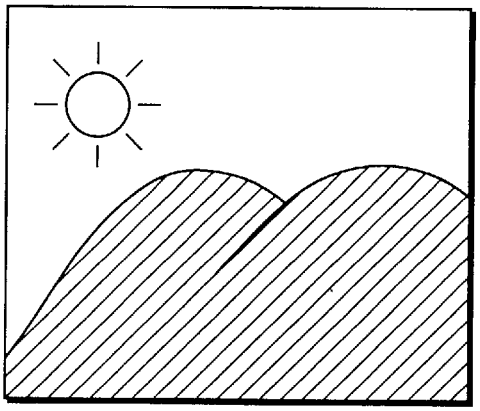
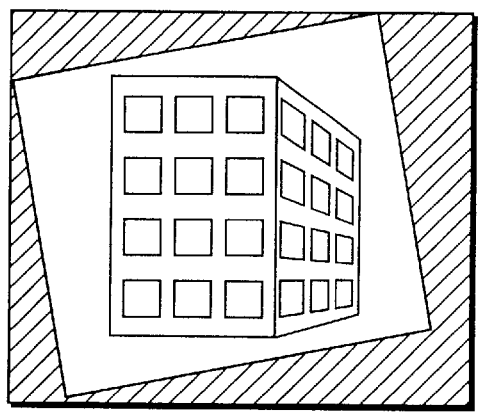
FIG. 13A    FIG. 13B
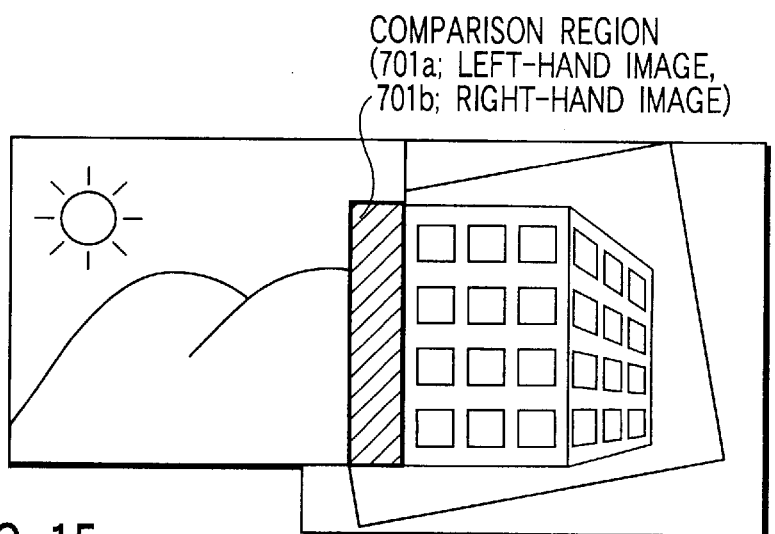
FIG. 15

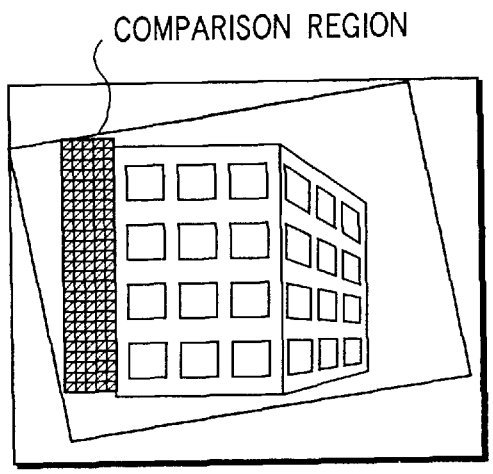
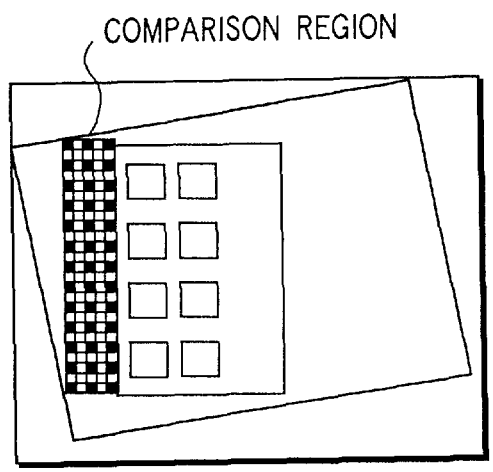
FIG. 16A    FIG. 16B
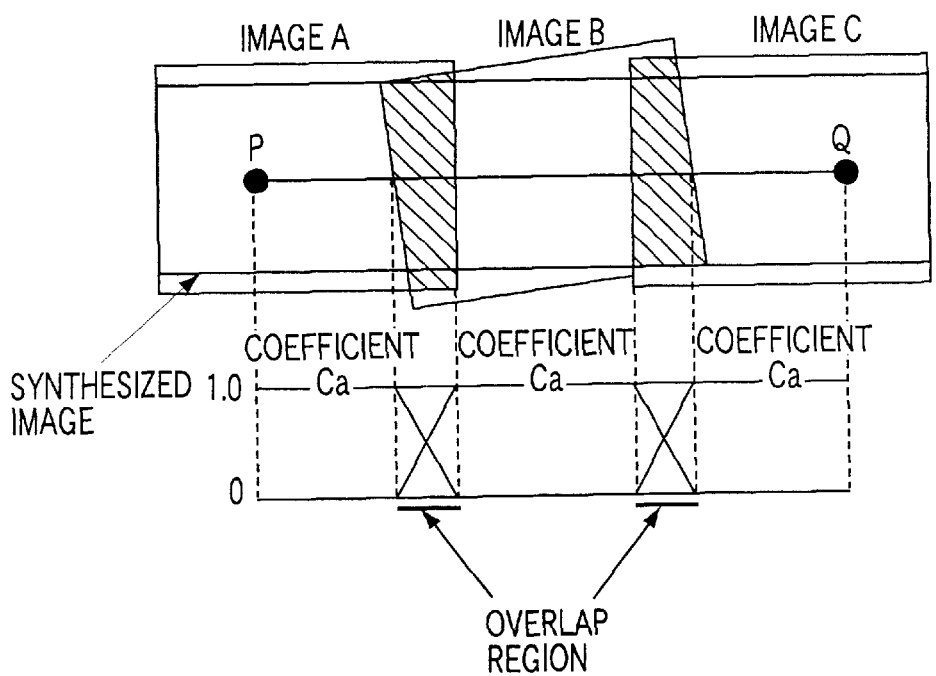
FIG. 18B PRIOR ART

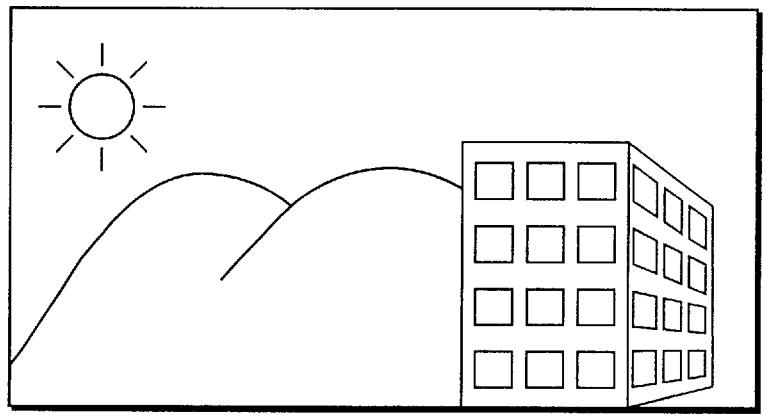
FIG. 21 PRIOR ART
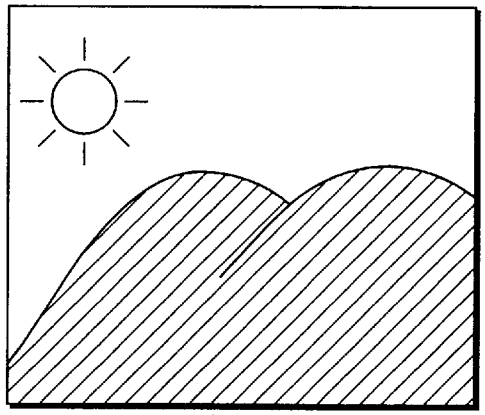 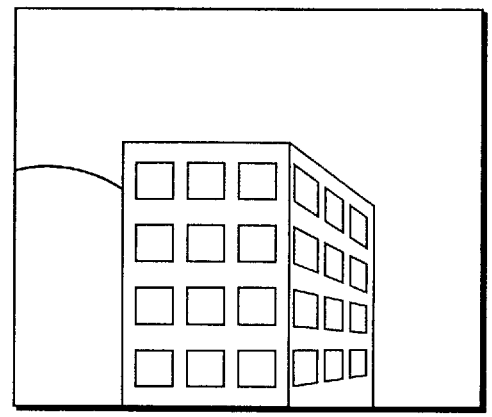
FIG. 22A PRIOR ART          FIG. 22B PRIOR ART

IMAGE SYNTHESIZING APPARATUS

BACKGROUND OF THE INVENTION

The present invention relates to an image synthesizing apparatus structured such that overlap portions are provided for each image, followed by dividing one composition into sections to be photographed by a plurality of photographing operations and followed by sequentially connecting the photographed images to one another so that a precise image or an image having a wide angle of view is formed or an all round panoramic photograph is taken.

Recently, reduction in the cost of high-performance personal computers has been realized, causing personal computers to widely be used in companies, schools and homes. Simultaneously, visual information apparatuses including digital still cameras and digital video cameras have been widely used because of easiness of capturing an image into the personal computer in place of conventional film cameras.

The digital camera is not required to perform a development process of a photographed image and is permitted to easily delete and edit photographed images. Therefore, digital cameras have widely been used mainly by users of the personal computers.

However, images photographed by a solid-state image device, such as CCD, suffer from inferior resolution to that of an image exposed to a film. Therefore, raising of the resolution has considerably be required.

The resolution can be raised by increasing the number of pixels of the image pickup device. A fact is known that the cost of the solid-state image device is excessively raised in proportion to the number of pixels. Thus, the overall cost of the camera is raised excessively.

Therefore, the applicant of the present invention has developed a technique for connecting, to one another, images photographed by a plurality of image pickup devices and another technique of photographing a subject in a division manner by, for example, moving a camera, to connect images photographed by one image pickup device, which has been filed as U.S. patent application Ser. No. 08/969,937.

An example of the image synthesizing techniques of a type in which a plurality of image pickup devices are disposed so as to be operated as one image pickup device will simply be described with reference to FIG. 18A.

The foregoing image pickup apparatus incorporates image input portions 1a, 1b and 1c each having an optical system 2, an image pickup portion 3 including an image pickup device, such as a CCD, an A/D conversion portion 4 for converting analog data to digital data; an image synthesizing portion 6 for connecting the supplied images A, B and C; a monitor 7 for displaying a synthesized image; a printer 8; and a storage medium 9. Although each of the image input portions 1a, 1b and 1c generally incorporates an image processing portion for adjusting white balance for compressing image data so as to efficiently store image data, the image processing portion is omitted from illustration.

The image of a subject 5 is divided into a plurality of images each having overlap portions, and then photographed by the image input portions 1a, 1b and 1c. The photographed images are supplied to the image synthesizing portion 6. The image synthesizing portion 6 uses image data of the overlap portions of the images to calculate the positional relationship among the images. Then, the image synthesizing portion 6 forms and transmits a connected image to the monitor 7 or the like.

FIG. 23 shows the structure of the image synthesizing portion 6.

The images A, B and C photographed by the image input portions 1a, 1b and 1c are temporarily stored in frame memories 10a, 10b and 10c. Then, deviation detectors 11a and 11b calculate the positional relationships (amounts of parallel translation and quantities of rotations) of the adjacent images in accordance with image data of the overlap portions. The results of the calculations are supplied to interpolators 12a and 12b.

The interpolator 12a interpolates the image B by using the output of the detector 11a, generating an interpolated image B. The interpolator 12b interpolates the image C by using the outputs of the detectors 11a and 11b, generating an interpolated image C. The image A used as a reference image in this case, the interpolated image B, and the interpolated image C are supplied to a coefficient determining device 13. The pixels of the image A, those of the interpolated image B, and those of the interpolated image C are multiplied by a predetermined coefficient used in weighting addition. The three images subjected to the multiplication are supplied to an adder 15, which adds the correct images, forming a combined image. The combined image is temporarily stored in a frame memory 16 and can be output therefrom whenever necessary.

As shown in FIG. 18B, the coefficient determining device 13 determines coefficients Ca, Cb and Cc in such a manner that the weights are gradually reduced (or enlarged) in the overlap portions.

The above-mentioned technique is able to effectively raise the resolution of a digital image. Moreover, the technique can be used to enlarge the angle of view. In addition, the technique can be applied to the following technique as well as the technique for simply enlarging the angle of view.

Software has been put into practical use so that an image photographed in an angular degree of 360° about a certain point, that is, a so-called panoramic image is used as an original image. Then, a required viewpoint is selected by operating a mouse or a keyboard to form an image photographed by a camera directed to the direction of the selected viewpoint. Thus, the image is displayed on a display unit. The foregoing software enables a user to arbitrarily observe subjects from a required direction. Therefore, the user is able to feel a virtual reality as if the user standing at the photographing point looks around the user.

To form the panoramic image, two methods have been widely used.

One of the two methods is a method using a panoramic camera having an aperture portion which is rotated in synchronization with the operation for winding a film up so that an image is photographed. Another method is a method of forming a panoramic image by rotating a usual camera on a horizontal plane to photograph divided sections of a subject by performing a plurality of photographing operations and by connecting the formed images to one another.

The latter method of the two methods will now be described.

The latter method uses the technique disclosed in the ITEC '91 theses, ITE Annual Convention, 1991, and shown in FIGS. 19 and 20.

Referring to FIG. 19, symbol R represents subject and O represents a reference point of a camera (in general which is a node of an optical system). Projection planes Q and Q' are planes onto which the subject is projected when the subject is photographed. In the foregoing case, a cylinder P is a projection plane equivalent to the projection plane when a panoramic image is photographed by the first method, the cylinder P being a cylinder formed around the point O.

A plurality of images projected onto the projection planes Q and Q' are converted into images projected onto the cylinder P, followed by connecting adjacent images to one another.

For example, FIG. 20A shows images photographed by a camera and projected onto the projection planes Q and Q'. FIG. 20B shows images formed by projecting photographed images from the projection planes Q and Q' to the cylinder P. When the foregoing images are connected to each other by a method disclosed in U.S. Ser. No. 08/969,937 an image as shown in FIG. 20C can be obtained. The obtained image is equivalent to the image photographed by the former method of the two methods.

The technique is structured to perform a smoothing process when the adjacent images are connected to each other. Therefore, the overlap portions can smoothly be connected to each other. If a subject as shown in FIG. 21 is photographed, the sky having a large ratio is photographed in the left-hand image, as shown in FIG. 22A. As compared with a right-hand image shown in FIG. 22B in which only a building is photographed, the overall image is therefore exposed relatively dark. When the two images are connected to each other by the above-mentioned disclosed technique, the difference in the exposure can be smoothed in the connected image. However, the difference in the brightness becomes conspicuous between the right-hand portion and the left-hand portion. As a result, an unnatural image is undesirably formed.

In Jpn. Pat. Appln. KOKAI Publication No. 9-93430, a technique for correcting the exposure after which images are connected to one another has been disclosed. According to the foregoing disclosure, a method has been disclosed in which the difference in the average value between the overall overlap portions of the images is used to determine a correction coefficient. Another method has been disclosed in which a plurality of feature points are detected so that a correction coefficient is determined from the pixel values of the detected feature points by a least-square method.

If registration is appropriately performed by the conventional technique when the images are connected to each other by the above-mentioned technique for synthesizing images, exposure correction has the following problem. That is, when the method disclosed in Jpn. Pat. Appln. KOKAI Publication No. 9-93430 is employed to correct the exposure, the portion having a pixel value near the average value can substantially accurately be connected. However, pixel values different from the average value have large errors. Since a plurality of feature points are searched for, excessively long time is required to complete the process. Thus, the foregoing problems arise.

The technique disclosed in Jpn. Pat. Appln. KOKAI Publication No. 9-93430 has the structure that the values allowed to overflow the gradation range of the original image are normalized after the correction has been performed to maintain the same number of gradient levels as that of the original image before it is corrected. However, the above-mentioned method encounters a false contour which is formed in a portion having a highest gradation value.

To employ the latter method for forming a panoramic image when the images are connected to one another, the angles of view of the photographing devices must be known in order to determine the radius of the cylinder onto which the photographed image is projected. Although the angle of view can be calculated from the focal distance and the size of the image pickup device, many users do not have the foregoing knowledge. In recent years, cameras of a type having a lens provided with a zooming function have been widely used. The focal distance realized at the photographing operation can be detected only at the two ends of the zooming movement.

BRIEF SUMMARY OF THE INVENTION

An object of the present invention is to provide an image synthesizing apparatus arranged to connect and synthesize a plurality of images obtained by photographing one subject (one composition) to have overlap portions (overlap regions) so as to form one image and capable of appropriately connecting the images to one another by automatically calculating angles of view from the overlap portions of adjacent images so as to correct the angles of view and accurately correcting exposure in accordance with pixel values of the overlap portions while elongation of processing time is prevented.

According to one aspect of the present invention, there is provided an image synthesizing apparatus for connecting divided images obtained by photographing one composition such that the one composition is divided into a plurality of sections in such a manner that overlap portions between adjacent images are included so that the original composition is restored, the image synthesizing apparatus comprising: exposure correction means for selecting at least a portion of pixel groups in the overlap regions of the divided images, the positional relationship of each of which has been corrected such that connection of adjacent images is permitted, calculating a correction coefficient which is determined in accordance with an average and dispersion of pixel values and correcting exposure of each of all images which must be connected to one another or each images except for a reference image in accordance with the correction coefficient; and image synthesizing means for producing an image of the original composition by connecting the divided images having the exposure corrected by the exposure correction means.

According to another aspect of the present invention, there is provided an image synthesizing apparatus for connecting and synthesizing divided images obtained by photographing one composition such that the one composition is divided into a plurality of sections in such a manner that overlap portions between adjacent images are included, the image synthesizing apparatus comprising: image correction means structured to correct the positional relationship such that the connection of adjacent images is permitted by setting at least one portion of the same subject included in each of the overlap portions of adjacent images of the divided images as specific points and by subjecting data of coordinates of the positions of the specific points to a comparison to estimate angles of view of the images so as to perform a geometrical deforming process in accordance with estimated angles of view such that the positional relationships of the images coincide with each other; and image synthesizing means for connecting and synthesizing the divided images processed by the image correcting means.

The image synthesizing apparatuses according to the present invention have the structure to form a panoramic image (an image having a wide angle of view) by connecting a plurality of divided images obtained by photographing one subject or one composition such that the subject or the composition is divided into sections by the steps of selecting at least a portion of pixel groups of the overlap regions before the images are connected and synthesized; calculating a correction coefficient determined in accordance with an average pixel value and a dispersion value; subjecting the overall image which must be connected to one another or images except for a reference image to an exposure process to correct the exposure in accordance with the correction coefficient; and sequentially connecting and synthesizing the images each having the corrected exposure so that a panoramic image connected naturally in a viewpoint of the exposure is formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a diagram showing an example of the structure of an image synthesizing apparatus according to a fifth embodiment of the present invention and structured to perform correction of exposure and synthesis of images;

FIG. 12A is a diagram showing a template;

FIG. 12B is a diagram showing template matching;

FIGS. 13A and 13B are diagrams showing correction using a correction parameter value;

FIG. 15 is a diagram showing comparison regions for correcting exposure provided in overlap portions of images after the positional relationship has been corrected;

FIGS. 16A and 16B are diagrams showing a method of calculating an average of pixel values and dispersion in the comparison regions;

FIG. 18B is a diagram showing image synthesis;

FIG. 21 is a diagram showing an example of a composition of a panoramic image attempted to be photographed;

FIGS. 22A and 22B are diagrams showing image synthesis which is performed by the conventional image synthesizing apparatus.

DETAILED DESCRIPTION OF THE INVENTION

Figure 1:
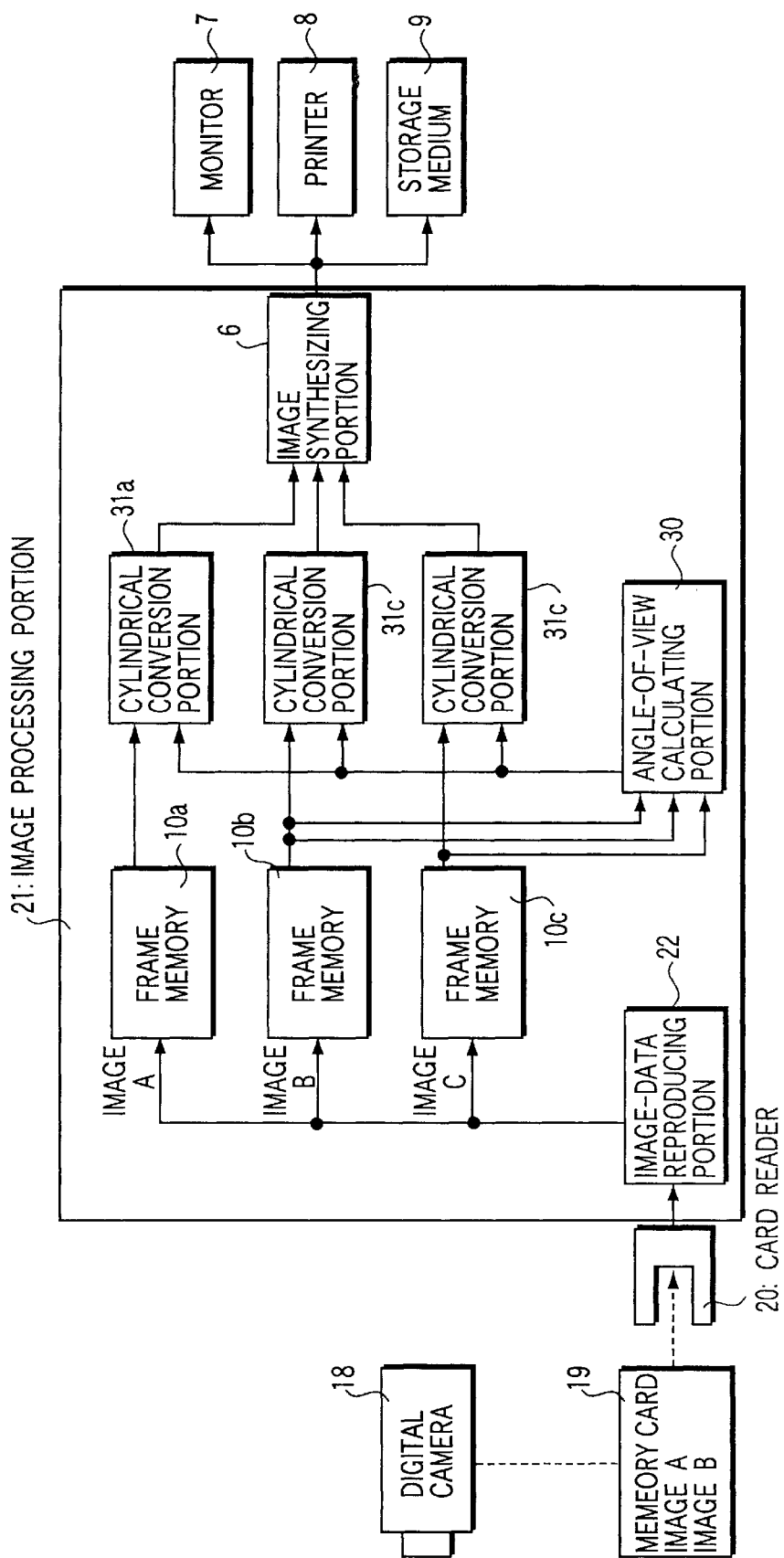
FIG. 1 is a diagram showing an example of the structure of an image synthesizing apparatus according to a first embodiment of the present invention.

Referring to the drawings, embodiments of the present invention will now be described with reference to the drawings.

According to the present invention, there is provided an image synthesizing apparatus for forming a panoramic image (an image having a wide angle of view) by connecting a plurality of divided images photographed by dividing one subject or one composition. The image synthesizing apparatus according to the present invention is structured such that the divided images are connected to one another to form a connected image having smooth color change and natural seams by correcting position and exposure of both or either of the two images.

The divided images according to the present embodiment are connected to one another such that adjacent images each having a portion of a photographed subject are connected to one another to form one image. The structure of the present invention does not form an image having a new composition such as a superimposing technique for synthesizing images having no relationship. The present invention is structured to restore an original subject (a composition).

To simply perform description, the following embodiments have a structure that divided images are images A, B and C. As a matter of course, the present invention is not limited to the structure that the original image is divided into three images.

Prior to describing the embodiment in which a synthesize image is subjected to exposure correction, an embodiment for connecting images photographed in the division manner will now be described.

FIG. 1 shows an example of the structure of an image synthesizing apparatus according to a first embodiment of the present invention.

The system according to the present embodiment incorporates a digital camera 18; a memory card 19 for storing images A, B and C photographed by the digital camera 18 such that a subject is divided into a plurality of sections; a card reader 20 for reading divided images; an image processing portion 21 for sequentially converting the plurality of the read images into images projected onto the surface of a cylinder and connecting and synthesizing the images to one another; a monitor 7; a printer 8; and a storage medium 9 which produces an output of the synthesized image having a wide angle of view.

The image processing portion 21 incorporates an image-data reproducing portion 22 for subjecting the images read from the memory card 19 to an expanding process or the like; frame memories 10a, 10b and 10c for temporarily storing images A, B and C subjected to the expanding process; an angle-of-view calculating portion 30 for sequentially reading adjacent images to estimate the angle of view by a method to be described later; a cylindrical conversion portion 31 for converting the images A, B and C into cylindrical images projected to the surface of the cylinder by using th estimated angle of view; and an image synthesizing portion 6 for sequentially connecting the cylinder images to one another so as to form a panoramic image.

In he present embodiment, one camera is used such that the photographing direction or the photographing position is changed to perform photographing operations plural times in such a manner that portions of a subject overlap each other. The present invention requires a fact that portions of the same subject are included in a portion of the obtained image. The photographing method is not limited particularly.

A process for connecting images by the image synthesizing apparatus structured as described will now be described.

Figures 2A, 2B:
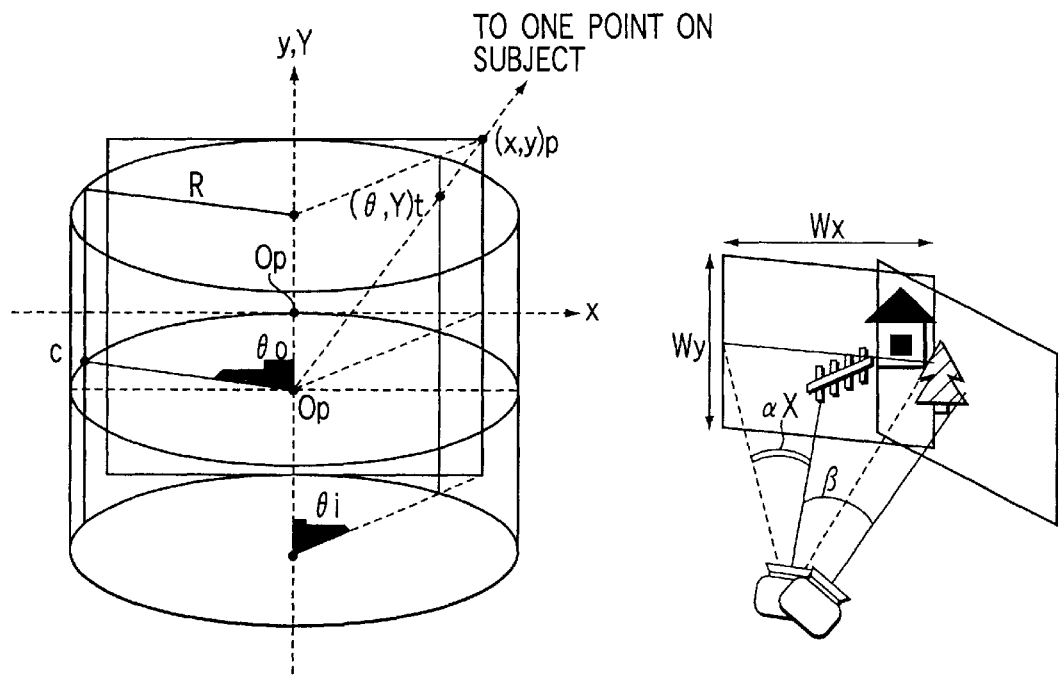
FIGS. 2A and 2B are diagrams showing geometrical deformation of images.

Initially, a subject (not shown) is photographed by one digital camera 18 while the subject is shifted such that portions of the same subject overlap each other in the two end portions of the images, as shown in FIG. 2B.

The photographed images are subjected to processes including adjustment of white balance and compression which are performed in a usual digital camera. Then, the image are stored in a removal memory card 19.

The card reader 20 is connected to the image processing portion 21 so that data including the images is read from the inserted memory card 19. Then, data including the images is subjected to an expanding process and so forth in the image-data reproducing portion 22. Thus, for example, images A, B and C are read so a to be stored in the frame memories 10a, 10b and 10c.

The angle-of-view calculating portion 30 reads adjacent images from the frame memories 10a, 10b and 10c so as to estimate angles of view by a method to be described later so as to produce an output to the cylindrical conversion portion 31. The cylindrical conversion portion 31 uses angle of view αx to convert the plurality of the photographed images into images projected onto the surface of the cylinder, as shown in FIG. 2A.

An assumption is made that the cylindrical coordinate of one point of a certain subject projected onto the cylinder are (θ, Y) t and the coordinates obtained by projecting the foregoing point on a photographing frame are (x, y) p.

Coordinates (X, Y) t are coordinates on the cylinder when X is expressed by the length along the surface of he cylinder. When the unit of θ is made to be radian, can be expressed such that X=R×θ.

Assumption is made that a reference point of the camera is Ot, the origin of the surface of the cylinder is C, the radius of the cylinder is R, the origin of the project surface of the photographed image is Op=(θ0, 0) t, the width of the photographed image is Wx and the angle of view αx is an angle of view in a direction X (from the center of the image to the end), as shown in FIG. 2B. The radius R of the cylinder is expressed a follows:

$$R = W_x / (2 \cdot \tan \alpha_x) \tag{1}$$

Thus, (x, y) p and (θ, Y) t has the following relationship:

$$(x, y)p = (R \cdot \tan(\theta - \theta_0), Y/\cos(\theta - \theta_0)) \tag{2}$$

Therefore, the above-mentioned equations are used to convert (x, y) p into (X, Y) t so that an image is formed such that the photographed image is projected onto the cylinder.

The image synthesizing portion 6 connects and synthesizes images to one another by a method similar to that disclosed in U.S. Ser. No. 08/969,937 so as to store the synthesized image in a storage medium or the like or produce an output.

An image process which is performed by the angle-of-view calculating portion 30 will now be described.

FIG. 2B shows a state in which a camera mounted on a tripod or the like (not shown) rotates about a subject by an angle β so that the subject is successively photographed. The angle of view of the camera in the lateral direction is αx and the size of the photographed image is Wx·Wy.

Initially, a portion of the same subject included in both of adjacent images is selected as one feature point. A method of detecting a feature point provided for one image as a corresponding point on another image may be a method disclosed in, for example, U.S. Ser. No. 08/969,937.

The foregoing feature point is projected to the position expressed by (θ, Y) t on the cylinder. An assumption is made that origins of the right and left images are OL=(θL, 0) t and OR =(θR, 0) and the coordinates of the feature point on the photographing frame are (xL, yL) p and (xR, yR) p.

In accordance with Equation (2), the following relationship is satisfied:

$$(x_L, y_L)_P = (R \cdot \tan(\theta - \theta_L), Y/\cos(\theta - \theta_L)) \tag{3}$$

$$(x_R, y_R)_P = (R \cdot \tan(\theta - \theta_R), Y/\cos(\theta - \theta_R)) \tag{4}$$

In accordance with the Equations (1), (3) and (4), the following equation is derived so that angle of view αx is obtained.

$$\tan \alpha_x = \sqrt{\frac{y_L^2 - y_R^2}{y_L^2 \cdot A_R^2 - y_R^2 \cdot A_L^2}}$$

$$A_R = 2 \cdot x_R / W_x, \quad A_L = 2 \cdot x_L / W_x \tag{5}$$

Also the difference β=(θ−θR)−(θ−θL) in the direction of the camera can be obtained from the following equation.

$$\tan(\theta - \theta_L) = \frac{2 \cdot x_L}{W_x} \cdot \tan \alpha_x \tag{6}$$

$$\tan(\theta - \theta_R) = \frac{2 \cdot x_R}{W_x} \cdot \tan \alpha_x \tag{7}$$

As described above, the angle of view can automatic ally be obtained from the images having overlap portions. Therefore, units for forming a panoramic image can be selected from various units. The above-mentioned method has the structure that the angle of view αx is obtained from a pair of a feature point and a corresponding point of two adjacent images. When the angle of view αx is determined by a least-square method by using a larger number of points, an adverse influence of an error caused from searching for the corresponding points and noise of the image can be reduced.

When three or more images are connected and synthesized to one another, consideration of the angle of views estimated between the all adjacent images enables an angle of view to further accurately be determined.

An image synthesizing apparatus according to a second embodiment will now be described with reference to FIGS. 3 and 4.

The image synthesizing apparatus according to the present embodiment is an apparatus for connecting a plurality of images obtained by dividing one subject (a composition) to one another to restore an original composition. The structure of the image synthesizing apparatus according to the present embodiment is similar to that according to the first embodiment except for a process which is performed by the angle-of-view calculating portion 30 shown in FIG. 4.

The angle-of-view calculating portion 30 incorporates interpolation calculating portions 42a and 42b for interpolating images A and B; an angle-of-view temporarily setting portion 40 for previously and sequentially select one value from a plurality of candidates of the angle of view to set the selected values to the interpolation calculating portions 42a and 42b; a comparison-region setting portion 41 for setting a range (a comparison region) in which the correlation of the adjacent images in the overlap portions is detected or the sum of absolute values of the difference is calculated; a correlation calculating portion 43 for calculating, as an evaluation value, mutual correlation, normalization mutual correlation or the sum of the absolute values of the difference which are generally used in matching of templates; a maximum-or-minimum determining portion 44 whether or not the correlation is maximum (minimum in the case of the sum of the absolute values of the difference); and an angle-of-view memory 45 for storing the set temporal angle of view if a determination is made that the correlation is a maximum. The angle of view read from the angle-of-view memory 45 is transmitted to the cylindrical conversion portions 31a, 31b and 31c.

The above-mentioned first embodiment has the structure that the angle of view αx is estimated from the coordinates of the feature points and the corresponding points. In the present embodiment, a temporal angle of view is used to subject an input image to the above-mentioned cylindrical conversion process, as shown in FIG. 3. Thus, the pixel values are subjected to a comparison in the overlap portions of the right and left images. As a result of the comparison, the angle of view having the highest correlation or having a smallest sum of the absolute values of the difference is made to be the angle of view which is photographed by the input apparatus.

The angle-of-view temporarily setting portion 40 of the angle-of-view calculating portion 30 previously stores fifteen candidates of the angle of view in, for example, units of 1° in a range from 15° to 30°. Then, the angle-of-view temporarily setting portion 40 sequentially selects one value to produce an output of the value to an interpolation calculating portion 42. As a matter of course, the range of the angle of view and the candidates of the angle of view may arbitrarily be determined in consideration of the purpose of use, the capacity of the memory and so forth.

The comparison-region setting portion 41 initially sets the feature points from image data items A and B and searches for the corresponding point. Then, the comparison-region setting portion 41 sets a range (the comparison region) in which the correlation (or the sum of the absolute values of the difference) of portions of the overlap portions of the adjacent images. Then, the comparison-region setting portion 41 produces outputs of the positions (the coordinates) and the sizes to the interpolation calculating portion 42.

Although the accuracy to estimate the angle of view can be improved when the overall overlap portions are made to be the comparison region, it is preferable that the size of the comparison region is varied to be suitable to the subject because time required to complete calculations is elongated undesirably. The adjacent images (which are images A and B in this case) are supplied to the interpolation calculating portion 42. Thus, the cylindrical conversion is performed in accordance with the predetermined temporal angle of view so that image data included in the comparison region is supplied to the correlation calculating portion 43.

The correlation calculating portion 43 calculates the mutual correlation, normalization mutual correlation or the sum of the absolute values of the difference as the evaluation value. The calculated evaluation value is subjected to a determination which is performed by the maximum-or-minimum determining portion 44 such that whether or not the correlation is maximum (minimum in the case of the sum of the absolute values of the difference) is determined. If the correlation is maximum (minimum in the case of the sum of the absolute values of the difference), the set temporal angle of view is stored in the angle-of-view memory 45.

Figure 3:
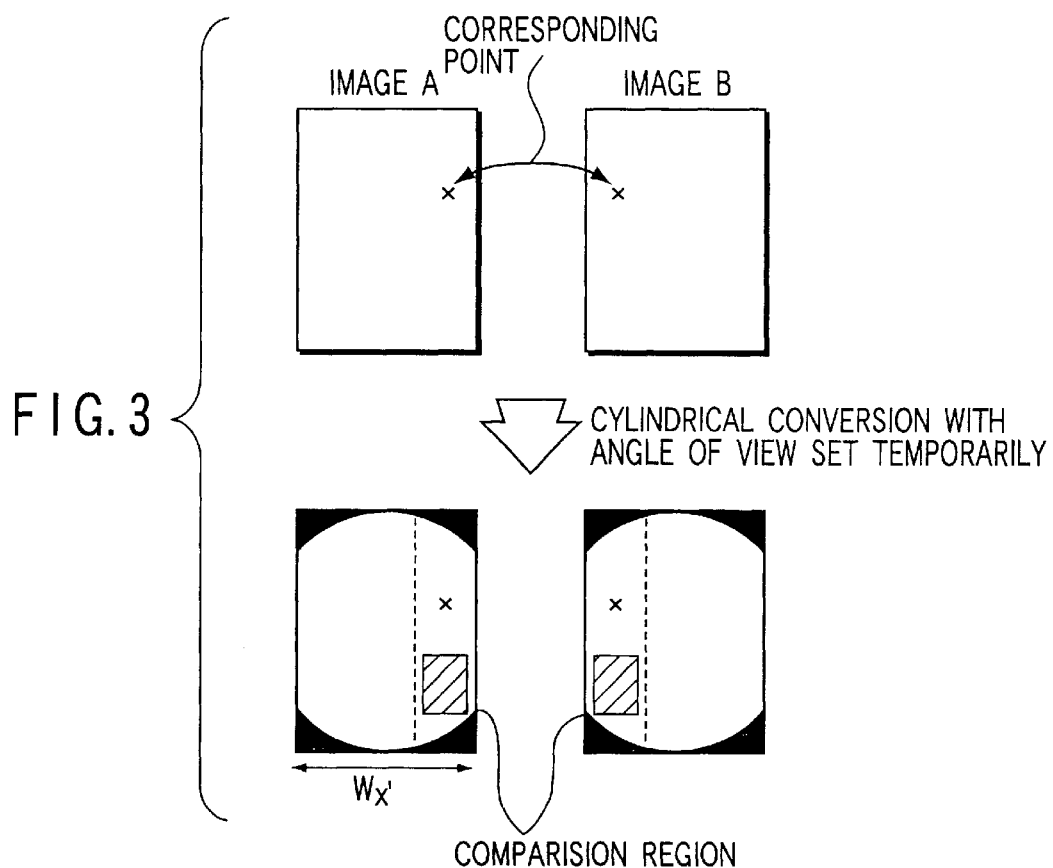
FIG. 3 is a diagram showing cylindrical conversion of an image.
Figure 4:
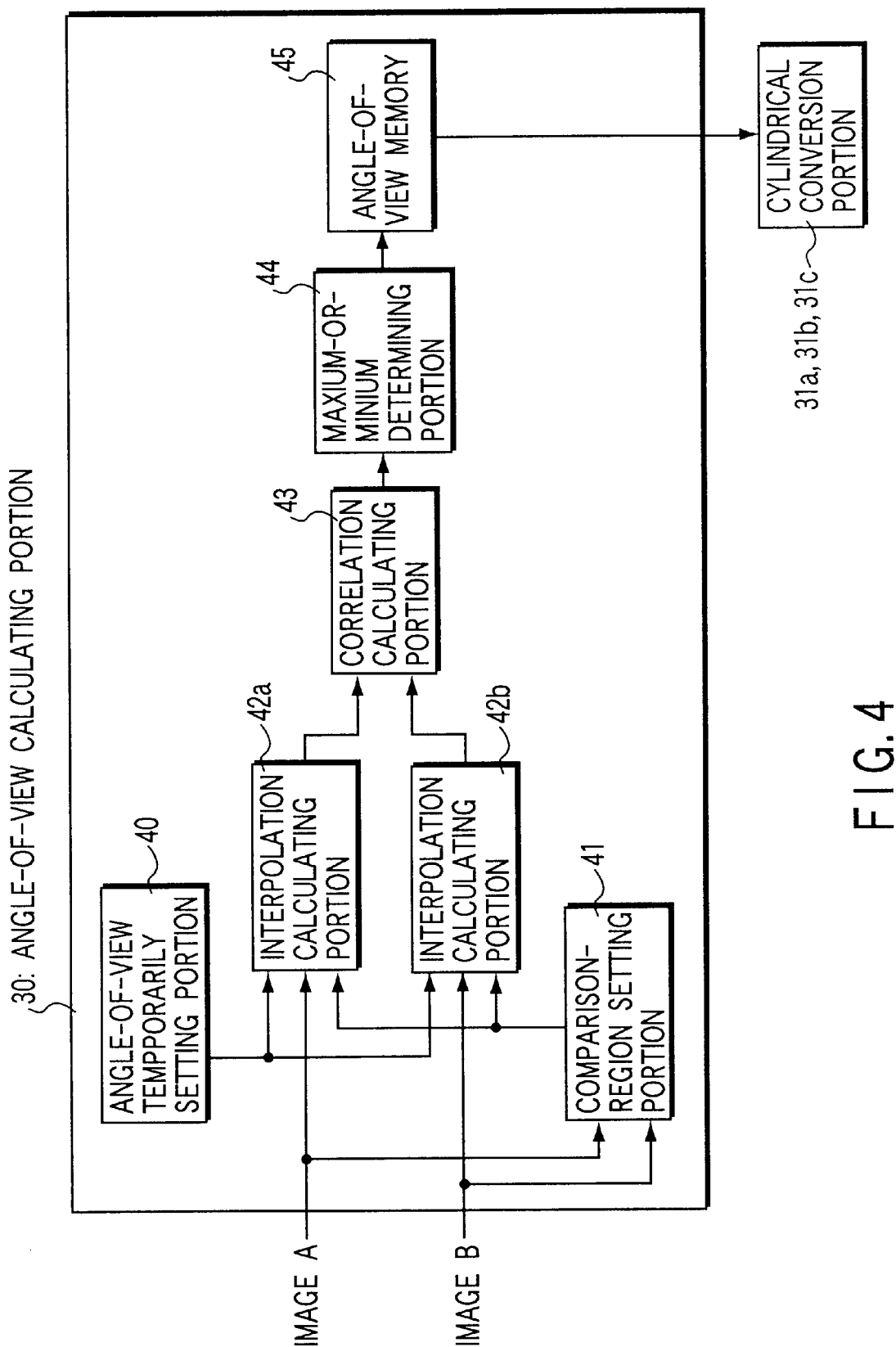
FIG. 4 is a diagram showing an example of the structure of an angle-of-view calculating portion of an image synthesizing apparatus according to a second embodiment.

Although the description has been made with reference to FIG. 3 such that the overall image is subjected to the cylindrical conversion, the cylindrical conversion of only the portion corresponding to the comparison region is required in actual. The angle-of-view temporarily setting portion 40 sequentially produces the set angles of view which must temporarily be stored. Each element of the angle-of-view calculating portion 30 repeatedly performs the above-mentioned process.

When all of the set angles of view stored previously have been completed, the value finally stored in the angle-of-view memory 45 is communicated to the cylindrical conversion portion 31 as the estimated angle of view.

Figure 5:
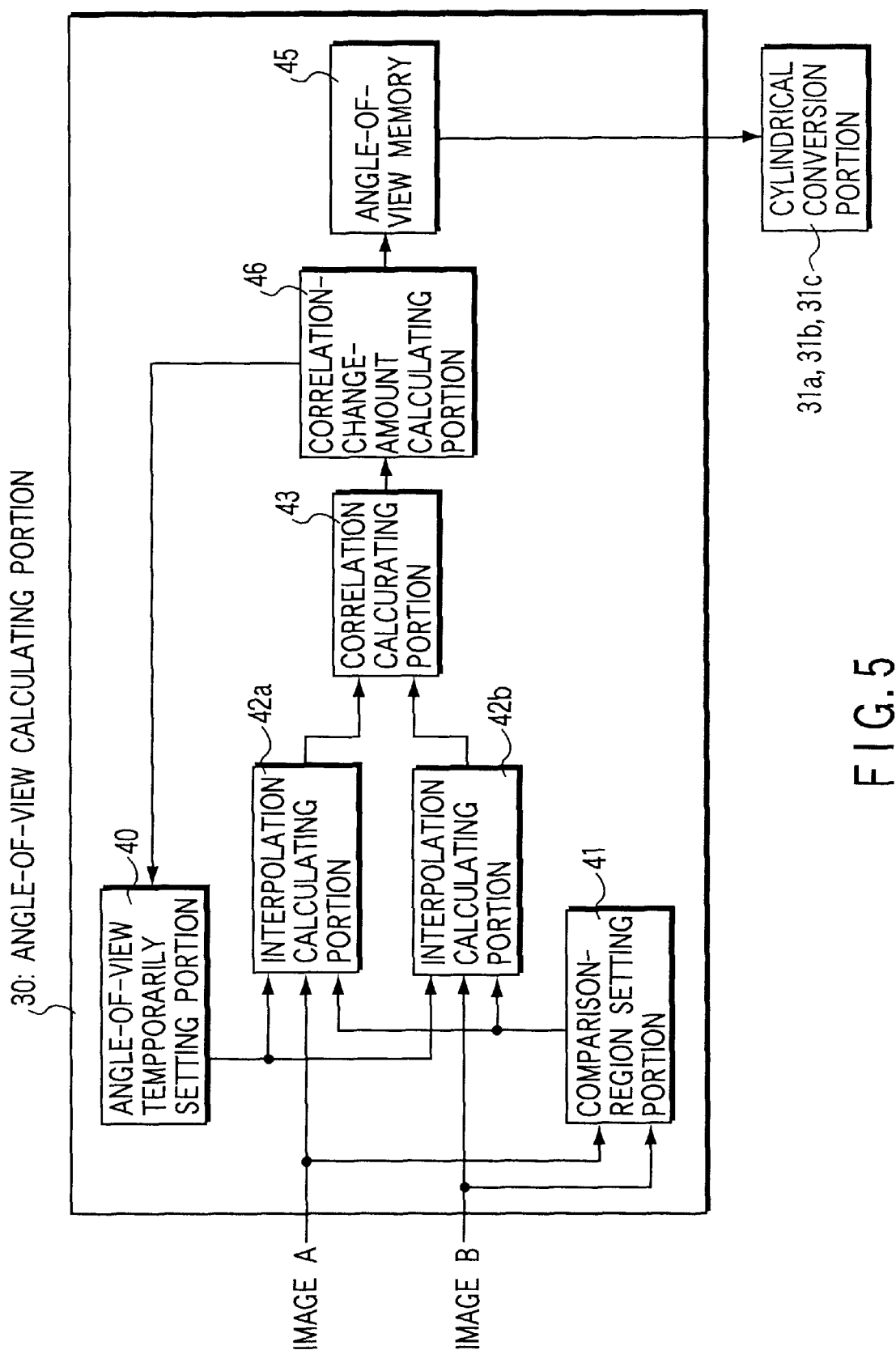
FIG. 5 is a diagram showing an example of the structure of an angle-of-view calculating portion of an image synthesizing apparatus according to a third embodiment.

Referring to FIG. 5, an image synthesizing apparatus according to a third embodiment will now be described.

The present embodiment is different from the second embodiment in the structure of the angle-of-view calculating portion 30. In place of the maximum-or-minimum determining portion 44, a correlation-change-amount calculating portion 46 is provided for the third embodiment. Thus, change in the correlation value between comparison regions is used to repeatedly set next temporal angles of view.

The comparison-region setting portion 41 sets comparison regions for supplied images A and B. Then, the interpolation calculating portion 42 performs the cylindrical conversion in accordance with the temporal angle of view. At this time, the temporal angle of view is not set by a method according to the second embodiment. The temporal angle of view is successively produced as follows.

Initially, the correlation-change-amount calculating portion 46 subjects the calculated correlation value and a correlation value calculated previously to a comparison to calculate an amount of change. Data of the calculated amount of change in the correlation value is fed back to the angle-of-view temporarily setting portion 40 so as to be used to determine a next temporal angle of view.

The temporal angle of view can be changed by an optimization method, such as a steepest descent method or a simulated annealing method.

The structure according to the present embodiment is able to eliminate a necessity of previously setting a candidate angle of view. That is, the angle of view can be determined in accordance with only the input images.

If a multiplicity of images must be synthesized by the structure according to the second or the third embodiment, the angle of view is estimated between the adjacent images, followed by averaging the plurality of the thus-obtained estimated values. Thus, a more accurate angle of view can be estimated.

Figure 6:
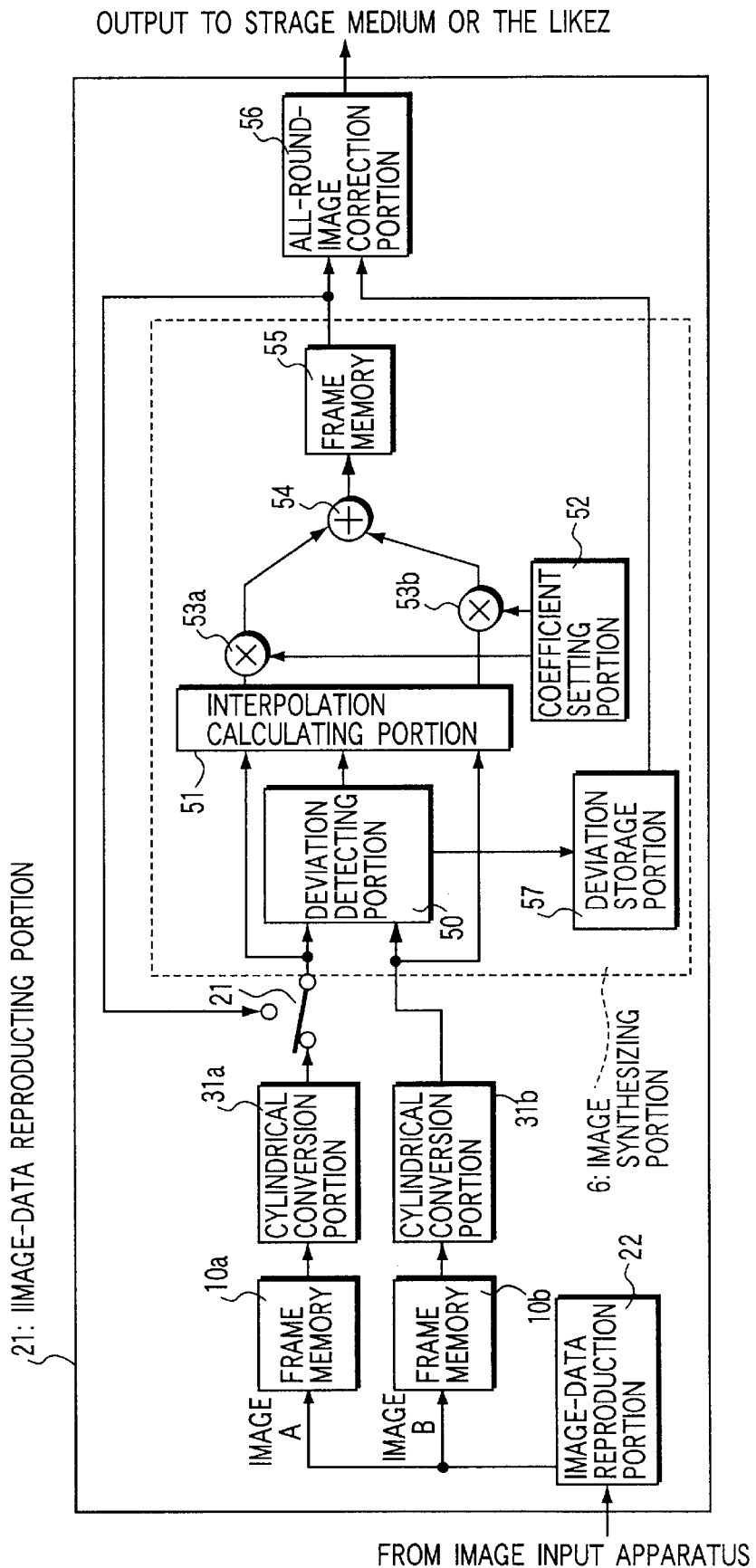
FIG. 6 is a diagram showing an example of the structure of an image processing portion of an image synthesizing apparatus according to a fourth embodiment.

Referring to FIG. 6, an image synthesizing apparatus according to a fourth embodiment will now be described. The same or similar elements to the elements shown in FIG. 1 are given the same reference numerals and the same or similar elements are omitted from description.

The image synthesizing apparatus according to the present embodiment incorporates an image-data reproducing portion 22 for subjecting image data items A and B supplied from an image input device to an expanding process; frame memories 10a and 10b for temporarily storing expanded image data items A and B; cylindrical conversion portions 31a and 31b for projecting read image data to the surface of a cylinder; an image synthesizing portion 6 for forming a synthesized image in accordance with the positional relationship calculated from the overlap portions of the images; an all-round-image correction portion 56 to be described later; and a switch portion 58 for switching the cylindrical conversion portion 31a or the synthesized image obtained previously to cause either of the image to the image synthesizing portion 6.

The process for connecting images by the image synthesizing apparatus structured as described above will now be described.

Images stored in the frame memories 10a and 10b are projected to the surface of the cylinder by the cylindrical conversion portions 31a and 31b in accordance with Equations (1) and (2). Image data projected onto the surface of the cylinder is supplied to the image synthesizing portion 6.

A deviation detecting portion 50 of the image synthesizing portion 6 calculates the positional relationship between adjacent images. Then, an interpolation calculating portion 51 forms an image corrected in accordance with the positional relationship. Then, a coefficient setting portion 52 determines weighting coefficient which is used to perform addition which is carried out to smoothly connect the adjacent images. The weighting coefficient is supplied to multipliers 53a and 53b so that image data is multiplied with the weighting coefficient. Then, an adder 54 adds the image data items to each other.

Added image data is, as a synthesized image, stored in a frame memory 55. The positional relationship detected by the deviation detecting portion 50 has been stored in a deviation storage portion 57. An image formed by the synthesizing process performed by the frame memory 55 is supplied to the image synthesizing portion 6 by operating the switch portion 58 so as to be connected to a next original image.

Assuming that N images are able to cover the all round, an N th image is connected and synthesized, and then a first image is connected to the N th image. Thus, two ends of an image covering 360° can smoothly be connected to each other.

After the first image has been connected, a resulted image and the value stored in the deviation storage portion 57 are supplied to the all-round-image correction portion 56.

Figure 7:
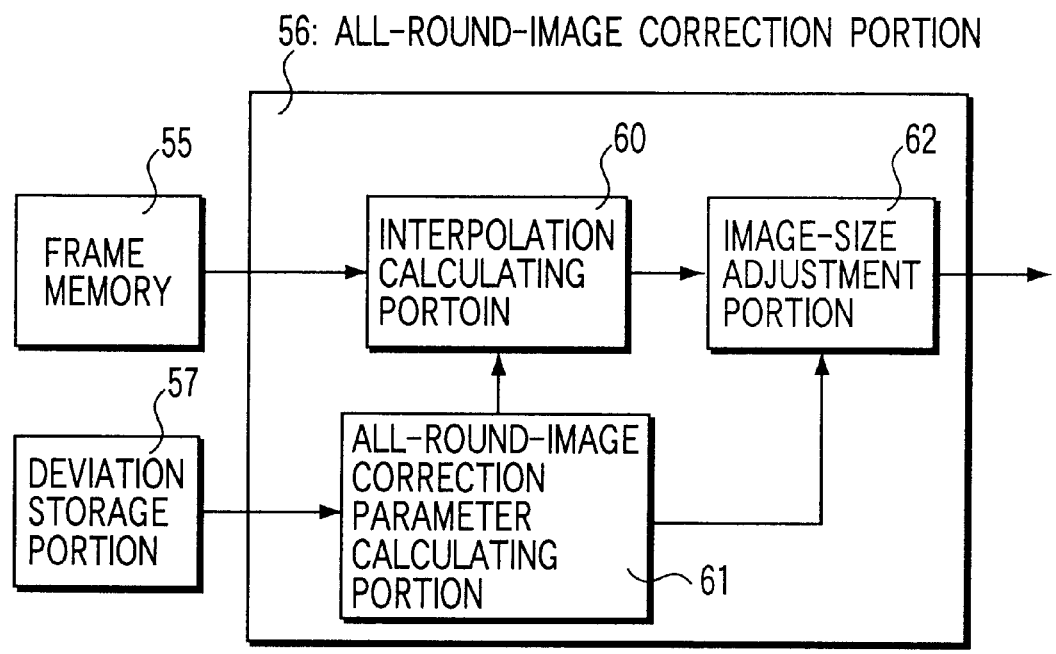
FIG. 7 is a diagram showing an example of the structure of an all-round-image correction portion of the image synthesizing apparatus according to the fourth embodiment.

FIG. 7 shows the structure of the all-round-image correction portion 56. The all-round-image correction portion 56 will now be described.

Figure 8:
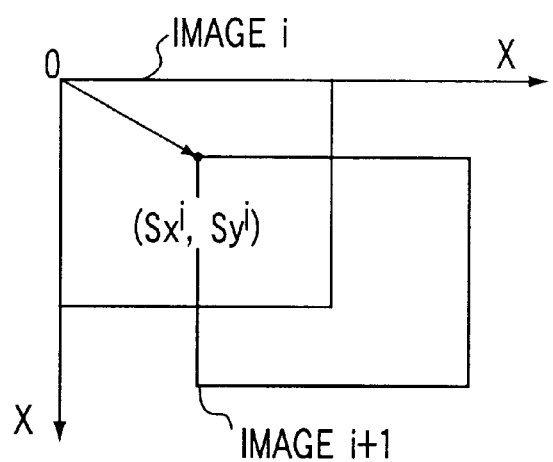
FIG. 8 is a diagram showing a diagram showing the positional relationship of images according to the fourth embodiment.

An all-round-image correction parameter calculating portion 61 of the all-round-image correction portion 56 calculates a rotational angle of the camera realized when a subject is photographed in accordance with the positional relationship read from the deviation storage portion 57. As shown in FIG. 8, an assumption is made that an amount of shift (a position to which a reference position of the i+1 th image is moved after the synthesis has been performed with reference to the origin of the i th image) between the i th image and the i+1 th image is (Sxi, Syi). Another assumption is made that the image is fully covered by N th images. Where $S_x^N$ and $S_y^N$ are the shift of the N image and the 1 th image. A sum of the shift (Sx, Sy) (see FIG. 9A) is expressed by the following Equation (8):

$$S_x = \sum_{i=1}^{N} S_x^i, \quad S_y = \sum_{i=1}^{N} S_y^i \tag{8}$$

Rotational angle γ around an optical axis realized when a photographing operation is performed is expressed by the following Equation (9):

$$\gamma = \tan^{-1}(S_y/S_x) \tag{9}$$

Figure 9A:
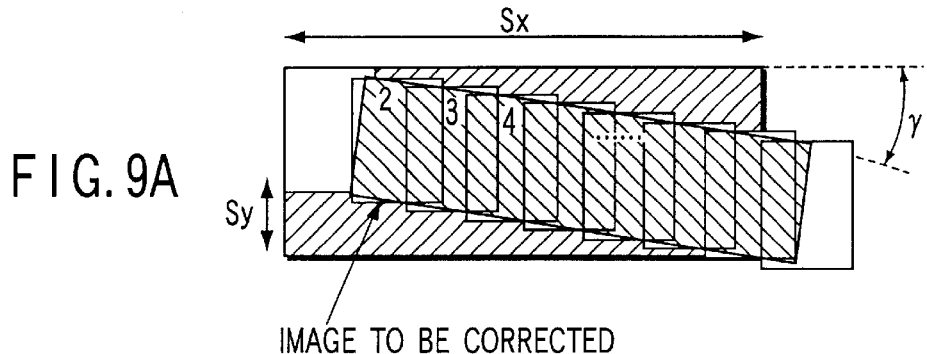
FIGS. 9A and 9B are diagrams showing a process for connecting and synthesizing images photographed such that a subject is divided into a plurality of sections.
Figure 9B:
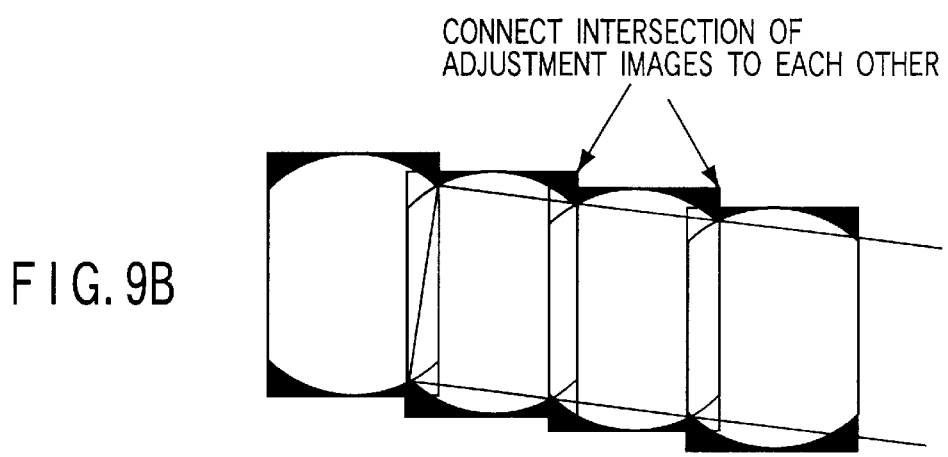

An interpolation calculating portion 60 rotates and corrects the supplied image by the rotational angle γ expressed in Equation (9) so as to form a rectangular image as shown in FIG. 9A. An image-size adjusting portion 62 cuts partial images which covers 360° when the partial images are connected to one another, the partial images being included in the corrected images. FIG. 9B shows an example in which the lower end of a first image serves as the reference. If an intersection between adjacent images is considered, addition of a black portion which does not include data to a final image can be prevented. Thus, a fine image can be obtained.

In the present embodiment, the whole image is rotated and corrected. Instead, the first and last images forming a panorama picture may be slightly displaced in the column direction of pixels so that their opposing ends match each other.

Referring to FIG. 10, an image synthesizing apparatus according to a fifth embodiment will now be described.

The present embodiment has a structure that exposure of each of images photographed in the division manner is corrected before the divided images are connected to one another by the method according to any one of the first to fourth embodiments. Thus, the overall image has natural exposure.

The image synthesizing apparatus according to the present embodiment incorporates image input portions 301a and 301b for photographing a subject (not shown) by an image pickup portion 303 thereof through an optical system 302 to convert the image into numerical digital data by an A/D conversion portion 304 thereof; frame memories 305a and 305b for temporarily storing image data items A and B; a deviation detecting portion 306 for calculating a parameter indicating the positional relationship between adjacent images in accordance with image data items A and B read from the frame memory 305 by a method to be described later; an interpolation calculating portion 307 for correcting parallel translation and rotation from the parameter and image data items A and B; an exposure processing portion 308 for calculating an exposure correction coefficient from the overlap portions of the images corrected by the interpolation calculating portion 307 so as to correct a subject image (either or both of images which must be connected to each other); and an image synthesizing portion 313 to be described later and arranged to synthesize the images.

The image synthesizing portion 313 incorporates a coefficient setting portion 309 for determining a weighting coefficient which is used when adjacent images are added to each other; a multiplier 311 for multiplying image data items A and B corrected by the exposure processing portion 308 with the coefficient determined by the coefficient setting portion 309; an adder 312 for adding image data multiplied with the coefficient; and a frame memory 310 for storing added image data.

The connection of images and correction of the exposure which are performed by the image synthesizing apparatus according to the present embodiment will now be described.

A subject (not shown) photographed by the image pickup portion 303 of the image input portions 301a and 301b through the optical system 302 is quantized by the A/D conversion portion 304 so as to be converted into digital data items. Then, digital data items are, as image data items A and B, temporarily stored in the frame memories 305a and 305b.

The operations which are performed by the image input portions 301a and 301b and which include an image process which is performed to correspond to the filter configuration on the device and a compressing process for reducing the size of an output image and an expanding process which is performed when image data is stored in the frame memory are not the essential portion of the present invention. Therefore, the foregoing processes are performed by known means and the means are omitted from description.

Image data items stored in the frame memory 305 are supplied to the deviation detecting portion 306. Thus, a parameter indicating the positional relationship between adjacent images is calculated by a method to be described later. The calculated parameter is supplied to the interpolation calculating portion 307. The interpolation calculating portion 307 corrects parallel translation and rotation from the parameter supplied from the deviation detecting portion 306 and image data above to produce an output. At this time, both of the two factors may be corrected to realize an intermediate state or only either of the two factors may be corrected with reference to either of the two factors.

The exposure processing portion 308 calculates an exposure correction coefficient from the overlap portions of image data corrected by the interpolation calculating portion 307 so as to correct the subject image and transmit the image. A correction method adapted to the exposure processing portion 308 will be described later.

Then, the coefficient setting portion 309 determines a weighting coefficient which is used when adjacent images are added similarly to the smoothing technique disclosed in U.S. Ser. No. 08/969,937. Image data is, by the multiplier 311, multiplied with the coefficient set by the coefficient setting portion 309, and then added to each other by the adder 312. Added image data is stored in the frame memory 310, and then transmitted to a variety of output apparatuses, such as a printer, a monitor or a storage medium, such as a hard disk. Since a process for transmitting image data from the frame memory 310 to the output apparatus is not the essential portion of the present invention, a known method is employed and the process is omitted from description.

Figure 11:
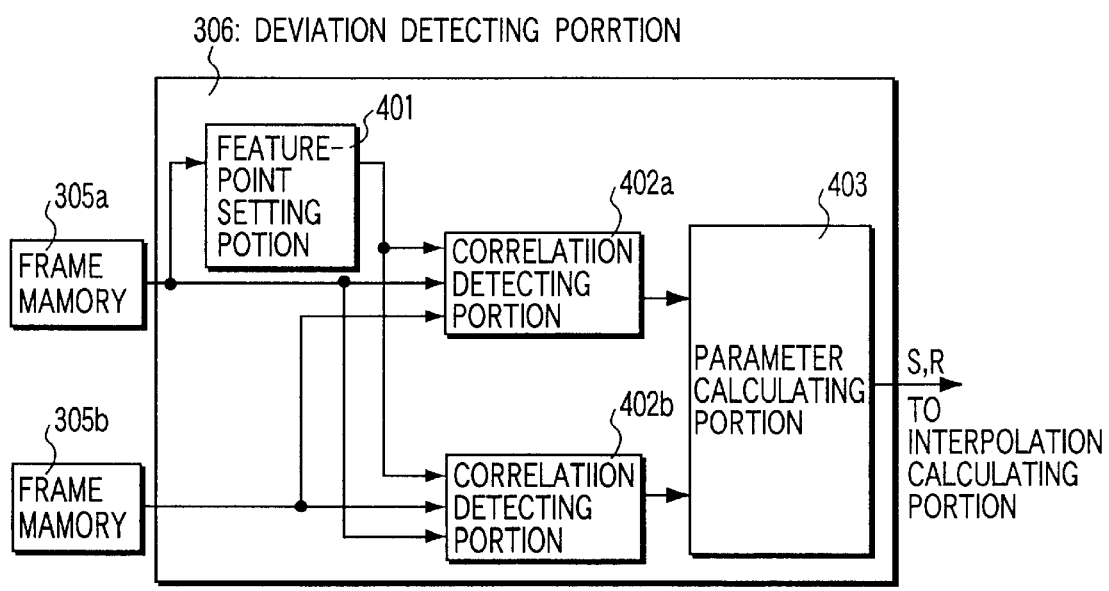
FIG. 11 is a diagram showing an example of the structure of the deviation detection portion shown in FIG. 10.

FIG. 11 is a schematic view showing the deviation detecting portion 306 shown in FIG. 10.

The deviation detecting portion 306 incorporates a feature-point setting portion 401 for setting a template block to a feature point in a reference image; a correlation detecting portion 402 for searching for corresponding points from image data so as to detect the positions of the feature points and corresponding points: and a parameter calculating portion 403 for detecting the positional relationship between the images as an amount of parallel translation which is expressed as s=(sx, sy) and rotational angle θ.

The feature-point setting portion 401 of the deviation detecting portion 306 structured as described above sets template blocks at feature points in the reference image. When the template is set to a point at which dispersion of a pixel value is maximum or a portion having an edge, accuracy to detect the corresponding point can be improved.

An assumption is made that the positions of two set feature points are (tx1, ty1) and (tx2, ty2).

The correlation detecting portion 402 searches for corresponding points from image data supplied from the frame memories 305a and 305b so as to transmit the positions of the feature points and corresponding points to the parameter calculating portion 403 (detection of the corresponding points will be described later). The obtained positions of the corresponding points are (mx1, my1) and (mx2, my2).

The parameter calculating portion 403 detects, from among the coordinates of images, the correspondence of each of which has been detected by the correlation detecting portion 402, the positional relationship between the subject images, the positional relationship being detected as an amount of parallel translation s=(sx, sy) and rotational angle θ. In accordance with the coordinates of the feature points and the corresponding points, the amount s of the parallel translation is expressed by the following Equation (10):

$$sx=(tx1+tx2)/2-(mx1+mx2)/2$$
$$sy=(ty1+ty2)/2-(my1+my2)/2 \quad (10)$$

where s is based on the origin of the reference image, and θ can be obtained from the outer product of vectors connecting feature points and corresponding points, respectively.

$$\theta=\sin^{-1}(\{(tx2-tx1)\cdot(my2-my1)-(ty2-ty1)\cdot(mx2-mx1)\}/(d_t \cdot d_m)) \quad (11)$$

where dt and dm are expressed by the following Equations (12) and (13):

$$d_t=\sqrt{(tx2-tx1)^2+(ty2-ty1)^2} \quad (12)$$
$$d_m=\sqrt{(mx2-mx1)^2+(my2-my1)^2} \quad (13)$$

Although the foregoing embodiment has the structure that the amount of the parallel translation and the rotational angle are obtained from two points, the parameters may be determined from the correspondence among three or more points by a least-square method. As disclosed in U.S. Ser. No. 08/969,937, s and θ may be calculated from a displacement vector.

To detect the correspondence between images, a method called template matching is employed. The template matching method is an evaluation method with which a small region called a template is set in either of the images as shown in FIG. 12A and a comparison is made while a block having the same size is moved in a search area provided for the inside portion of another image, as shown in FIG. 12B.

In this case, a method is usually employed in which the difference between pixel values in the small region are added, followed by regarding a position, at which the sum of the differences is minimum, as the point corresponding to the template. However, the foregoing method has a possibility that mismatch takes place between images which are subjects of the present invention and in which the difference in exposure has been made.

Correlation detecting portions 402a and 402b shown in FIG. 11 use values called normalization mutual correlation of images expressed by the following Equation (14). A point at which the foregoing value is maximum is regarded as the corresponding point:

$$E = \frac{\sum (a_L - A_L)\cdot(a_R - A_R)}{\sigma_L \cdot \sigma_R} \quad (14)$$

where $a_L$ and $a_R$ are pixel values in the right and left small blocks, $A_L$ and $A_R$ are average values of the pixels in the right and left small blocks, $\sigma_L$ and $\sigma_R$ are standard deviations of the pixels in the right and left small blocks, $\sigma_L^2$ and $\sigma_R^2$ indicate dispersion of the pixels and the sum of Equation (1) is added to all of the pixels in the small blocks.

The small blocks are blacks having the same size as the template set in either of the image and the template in a search area set in another image.

If the difference in exposure is not considerably large, evaluation may be performed with mutual correlation from which a portion which is normalized with the standard deviation expressed by Equation (14) is omitted, as expressed by the following Equation (15):

$$E=\Sigma(a_L-A_L)\cdot(a_R-A_R) \tag{15}$$

Since Equation (15) is able to eliminate a necessity of obtaining a standard deviation as compared with Equation (14), the processing speed can effectively be raised.

The deviation detecting portion 306 supplies, to the interpolation calculating portion 307, the amount of the parallel translation and the rotational angle serving as the correction parameters. In accordance with the values of the parameters, either or both of the subject images are corrected. An example of the corrected image is shown in FIG. 13.

Figure 14:
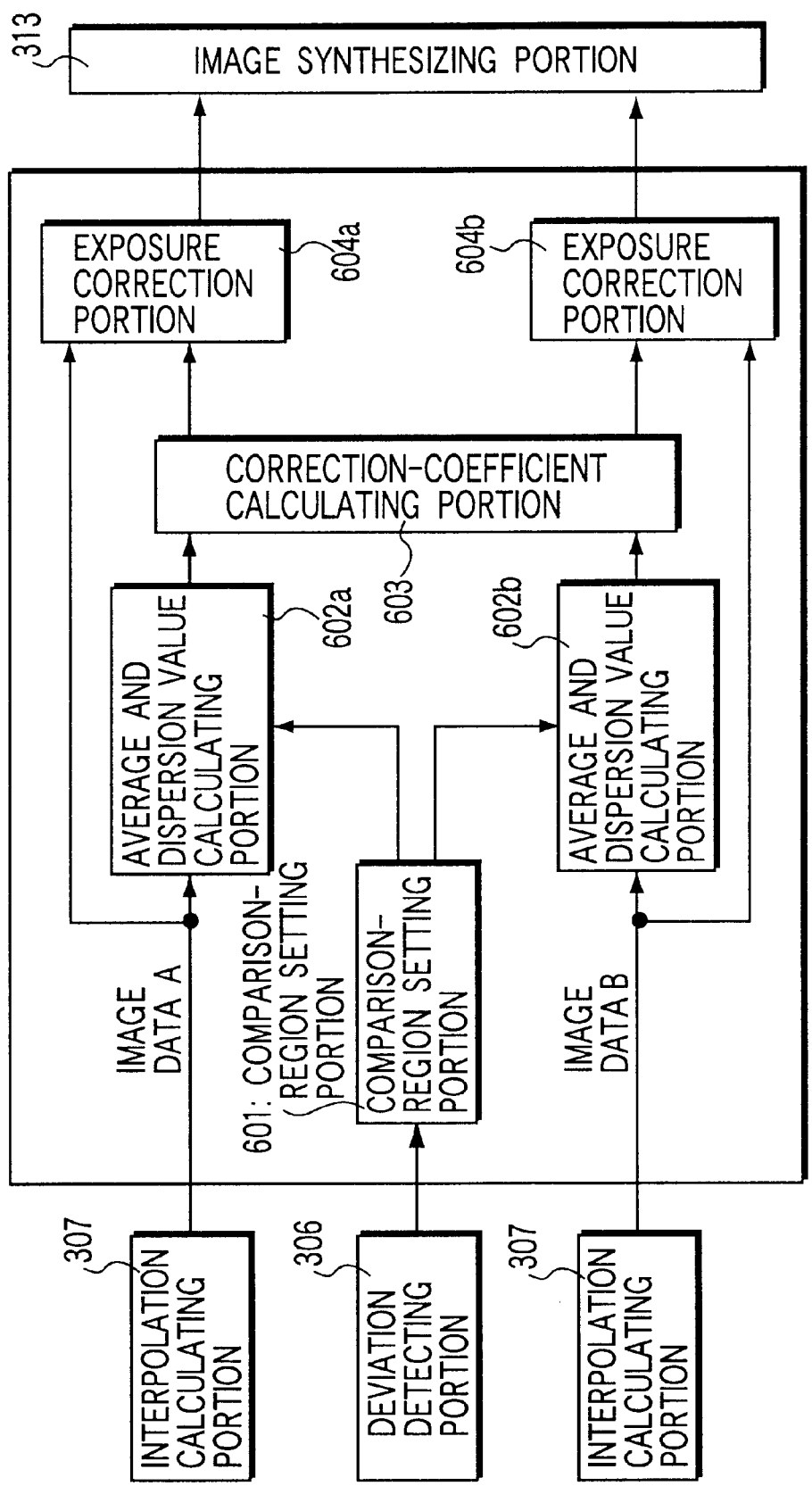
FIG. 14 is a diagram showing a specific structure of the exposure processing portion shown in FIG. 10.

FIG. 14 shows a specific structure of the exposure processing portion 308 shown in FIG. 10.

The exposure processing portion 308 incorporates a comparison-region setting portion 601 to which the amount of the parallel translation and the rotational angle detected by the deviation detecting portion 306 are supplied and which sets comparison regions 701*a* and 701*b* of image data common to the regions in which corrected images overlap each other, as shown in FIG. 15; average and dispersion value calculating portions 602*a* and 602*b* to which corrected image data items A and B are supplied from the interpolation calculating portion 307 and which calculate an average pixel value and dispersion value in the set comparison region; a correction-coefficient calculating portion 603 for calculating a correction coefficient from the average pixel value and the dispersion value of image data items A and B; and exposure correction portions 604*a* and 604*b* for correcting exposure in accordance with the calculated correction coefficient in such a manner that image data items A and B have common brightness.

An exposure process which is performed by the image synthesizing apparatus structured as described above will now be described.

Initially, the comparison-region setting portion 601 sets comparison regions 701*a* and 701*b* in the overlap portions of the corrected images, as shown in FIG. 15.

The rectangular comparison regions are set in the overlap portions in the case shown in FIG. 15 for the purpose of facilitating data access in the next correction-coefficient calculating portion 602*a*, 602*b*. If considerable shortening of the processing time is not required, the overall overlap portions may be set to be the comparison regions.

The correction-coefficient calculating portion 602*a*, 602*b* calculates the average value and dispersion value in the right and left comparison regions. In place of calculating all of the pixels in the overall comparison regions as shown in FIG. 16A, calculations of the average and dispersion values of pixels (pixels in a hatched section are pixels which are used in the calculations) obtained by performing thinning in several pixel units as shown in FIG. 16B shorten time required to complete the calculations.

Averages of the pixel values in the right and left comparison regions are $A_L$ and $A_R$, the standard deviations of the pixels are $\sigma_L$ and $\sigma_R$, and dispersion values of the pixel values are $\sigma_L^2$ and $\sigma_R^2$. The exposure correction is performed in accordance with Equation (16). The correction-coefficient calculating portion 603 determines C1 and C2 in Equation (16) with reference to the obtained average values and the dispersion values of the pixel values.

$$a_{after}=C_1\cdot a_{before}+C_2 \tag{16}$$

where $a_{before}$ is a pixel value before the correction is performed and $a_{after}$ is a corrected pixel value.

If the calculation of Equation (16) is resulted in deviation of the value of $a_{after}$ from a gradation range which expresses the pixel, the value is clipped to 0 or a maximum level of the gradation.

The correction coefficients for the right and left images as shown in FIG. 15 are C1L, C2L, C1R and C2R. Each of the correction coefficients is determined from the following equation in such a manner that the averages and dispersion of the right image and those of the left image coincide with each other.

(i) when the left image serves as the reference:

$$C_{1L}=1.0,\ C_{2L}=0.0$$

$$C_{1R}=\sigma_L/\sigma_R,\ C_{2R}=A_L-A_R\cdot\sigma_L/\sigma_R \tag{17}$$

(ii) when the right image serves as the reference:

$$C_{1L}=\sigma_R/\sigma_L,\ C_{2L}=A_R-A_L\cdot\sigma_R/\sigma_L$$

$$C_{2R}=1.0,\ C_{2R}=0.0 \tag{18}$$

(iii) when an intermediate image between the right and left images serves as the reference:

$$C_{1L}=\sqrt{\sigma_R/\sigma_L},\ C_{2L}=(A_L+A_R)/2-\sqrt{\sigma_R/\sigma_L}\cdot A_L \tag{19}$$

$$C_{1R}=\sqrt{\sigma_L/\sigma_R},\ C_{2R}=(A_L+A_R)/2-\sqrt{\sigma_L/\sigma_R}\cdot A_R \tag{20}$$

As described above, the correction coefficients C1L, C2L, C1R and C2R determined by the correction-coefficient calculating portion 603 are supplied to the exposure correction portions 604*a* and 604*b*. Thus, image data items A and B supplied from the interpolation calculating portion 307 are corrected. Image data items, the exposure of each of which has been corrected and which have been transmitted from the exposure correction portions 604*a* and 604*b*, are weighted and added in the image synthesizing portion 313 such that the overlap portions are smoothly connected to each other. Thus, an output of a formed image is produced. Note that the image synthesizing portion 313 is omitted from description.

If the number of gradation levels is 256 and the correction coefficient is a negative value, the pixel value for use in the correction operation is made to be a minimum value (for example, 0) to prevent a fact that the number of the gradation levels is 0 or smaller. On the other hand, a fact that a predetermined number of gradation levels is larger than a maximum signal level is prevented by fixing the pixel value to a maximum value (for example, 255) if the correction coefficient is a positive value.

Although the correction coefficient is obtained by, for example, Equations (17) to (20), a variety of modifications for obtaining the coefficient may be employed. As a matter of course, the present invention is not limited to the above-mentioned equations.

Figure 17:
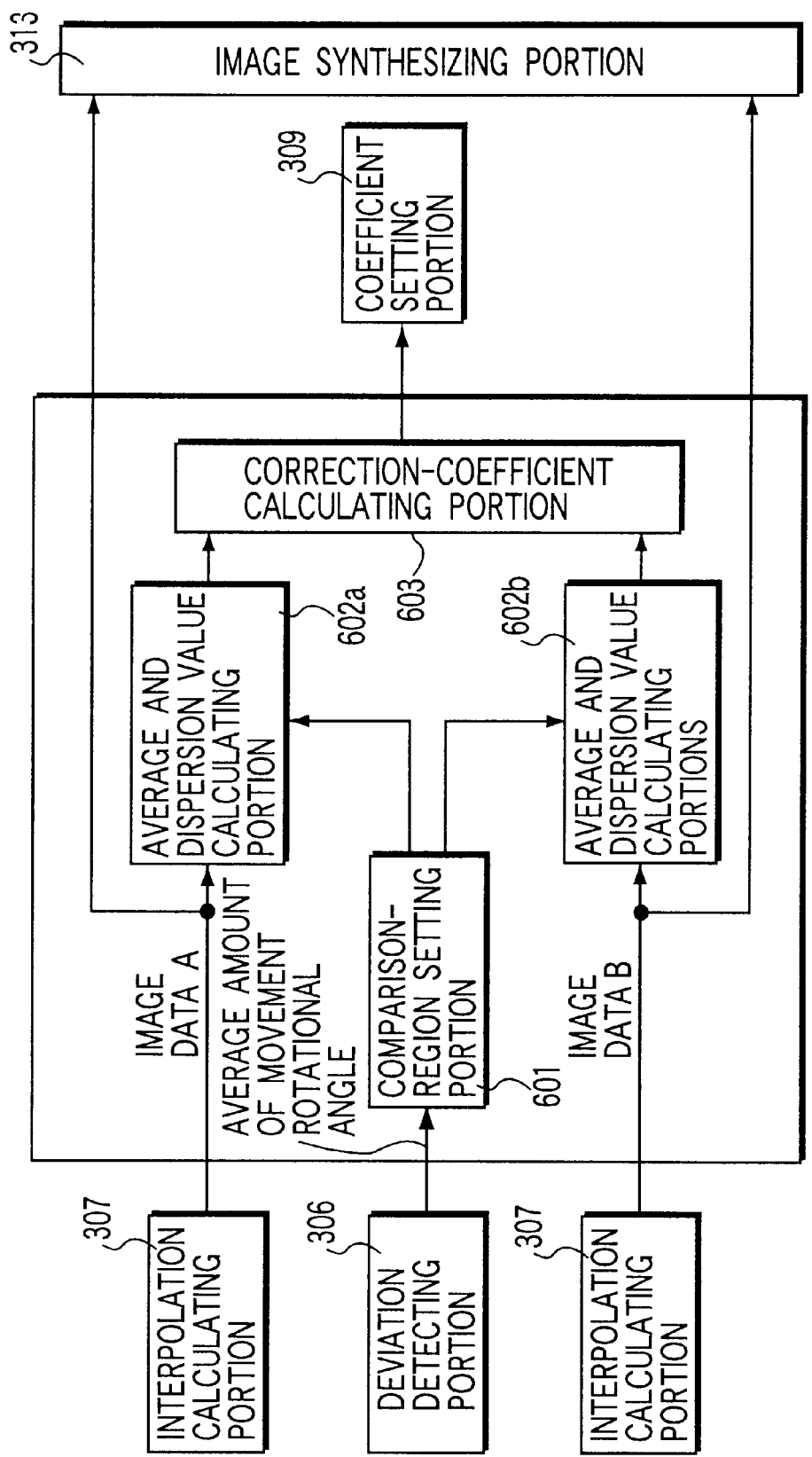
FIG. 17 is a diagram showing a modification of an image synthesizing apparatus according to a fifth embodiment.
Figure 18A:
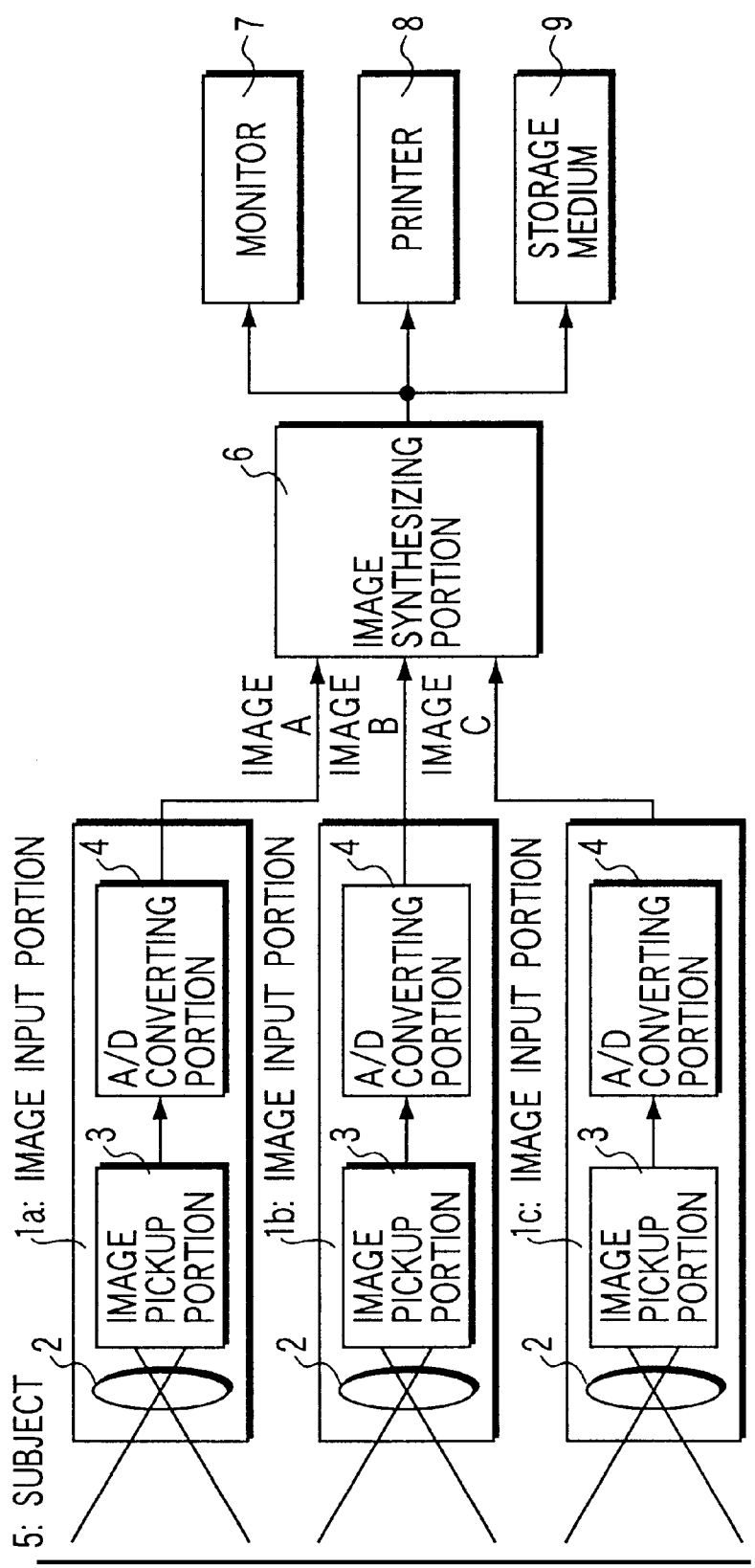
FIG. 18A is a diagram showing the structure of a conventional image synthesizing apparatus.
Figure 19:
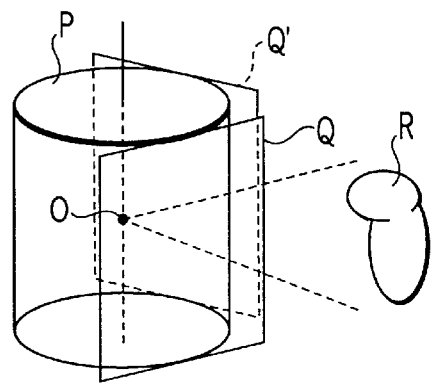
FIG. 19 is a diagram showing a conventional process for forming a panoramic image by connection.
Figure 20A:
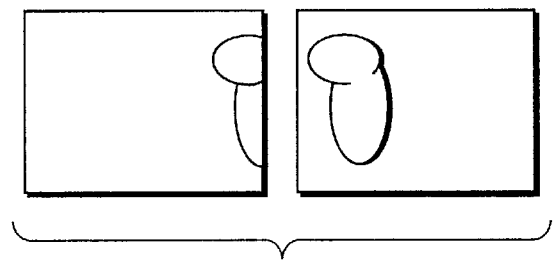
FIGS. 20A, 20B and 20C are diagrams showing image synthesis which is performed by a conventional apparatus for forming a panoramic image.
Figure 20B:
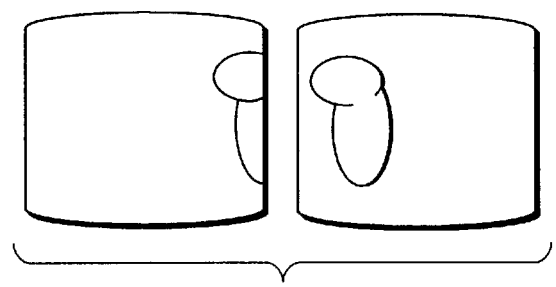
Figure 20C:
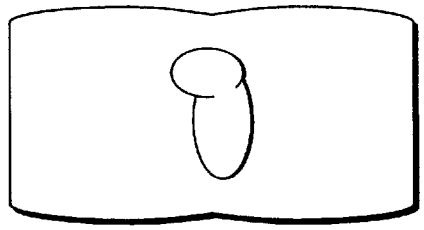
Figure 23:
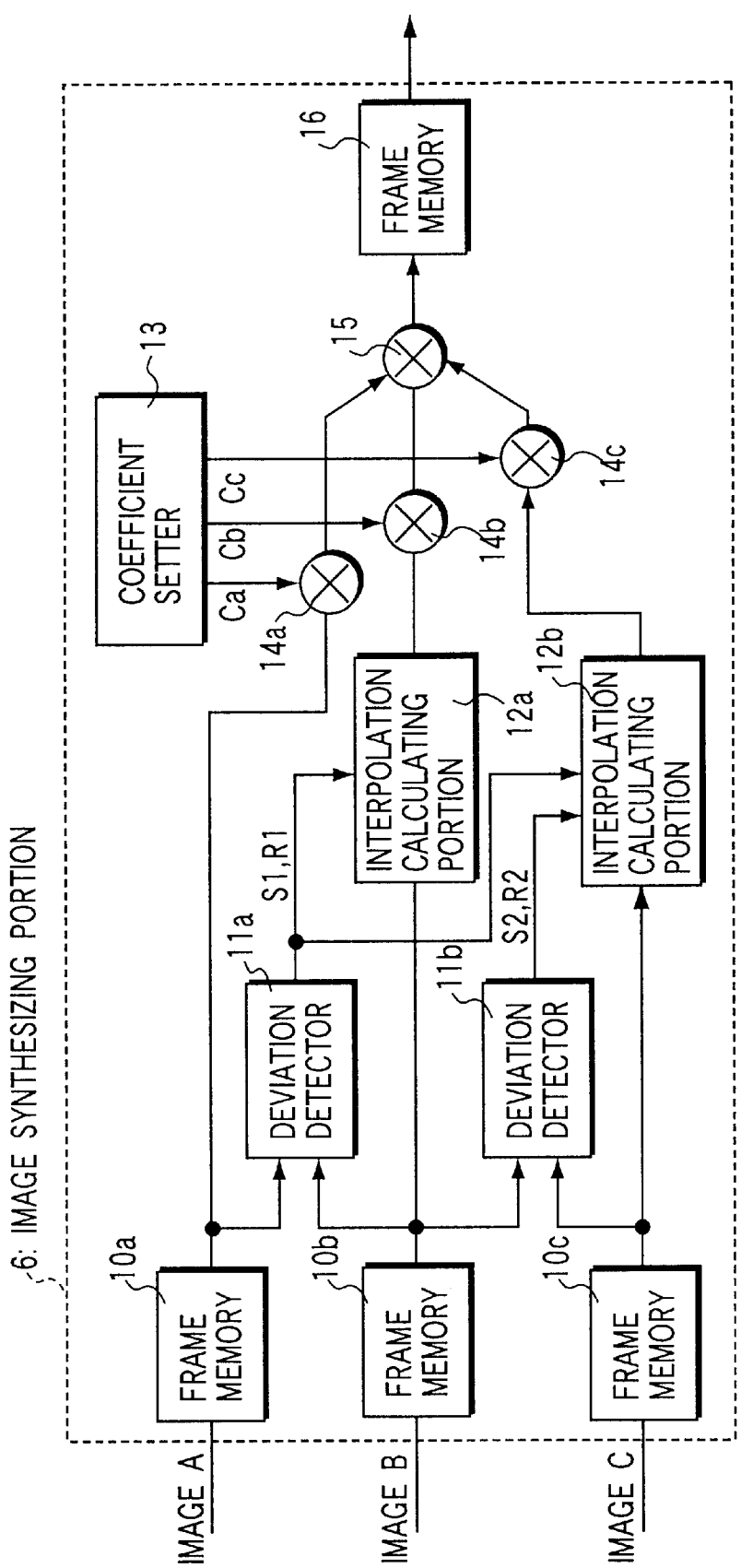
FIG. 23 is a diagram showing an example of the structure of an image synthesizing portion shown in FIG. 18.

The present embodiment has the structure that the exposure correction portion 604 is provided for the inside portion of the exposure processing portion 308 individually from the coefficient setting portion 309 to produce an output of an image having the corrected exposure to the image synthesizing portion 313. Another structure constituted as shown in FIG. 17 may be employed in which only the exposure correction coefficient is supplied to the coefficient setting portion 309 so as to set a smoothing coefficient between adjacent images which has the exposure correction effect.

As described above, the present invention has a structure that a plurality of images photographed by dividing a subject are connected to each other so as to synthesize the images such that correction coefficients calculated from overlap regions of adjacent images are used to appropriately connect the images to one another. Thus, an image synthesizing apparatus with which processing time is not elongated and which enables an accurate panoramic image to be obtained can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image synthesizing apparatus for connecting divided images obtained by photographing one composition such that the one composition is divided into a plurality of sections in such manner that overlap portions between adjacent images are included so that the original composition is restored, said image synthesizing apparatus comprising:

image correction means for setting at least one portion of the same subject included in each of the overlap portions of the adjacent images as specific points and subjecting data of coordinates of positions of the specific points to a comparison to estimate angles of view of the images so as to perform a geometrical deforming process in accordance with the estimated angles of view such that positional relationships of the images coincide with each other; and image synthesizing means for calculating a parallel translation distance and a rotational angle by detecting deviation of positions of a plurality of feature points in the overlap portions of the images which have been subjected to the geometrical deforming process so as to perform interpolation and connect the divided images to each other.

2. An image synthesizing apparatus according to claim 1, wherein said image correction means subjects a portion of the overlap portions of the adjacent images to a geometrical deforming process to subject the deformed images to a comparison so as to estimate the angle of view of each of the images and subject an overall image to a geometrical deforming process in accordance with the estimated angles of view.

3. An image synthesizing apparatus according to claim 2, wherein said image correction means incorporates parameter storage means which stores a plurality of parameters for the geometrical deforming process to which the overlap portions are subjected.

4. An image synthesizing apparatus according to claim 2, wherein said image correction means changes the parameter of the geometrical deforming process to which the overlap portions are subjected in accordance with a result of a comparison of the deformed images so as to correct the images.

5. An image synthesizing apparatus for connecting divided images obtained by photographing one composition such that the one composition is divided into a plurality of sections in such a manner that overlap portions between adjacent images are included so that the original composition is restored, said image synthesizing apparatus comprising:

exposure correction means for selecting at least a portion of pixel groups in the overlap regions of the divided images whose positional relationships have been corrected such that the connection of the adjacent images is permitted, calculating a correction coefficient which is determined in accordance with an average and dispersion of pixel values, and correcting the pixel values of the divided images with the calculated correction coefficient in a case where the pixel values do not satisfy a predetermined gradation range such that pixel values deviated from a lower limit are made to be a lowest level of the gradation range or zero and pixel values deviated from an upper limit are made to be a highest level of the gradation range, with regard to all of the divided images to be connected or images other than a reference image; and image synthesizing means for producing an image of the original composition by connecting the divided images whose exposure has been corrected by said exposure correction means.

6. An image synthesizing apparatus for connecting divided images obtained by photographing one composition such that the one composition is divided into a plurality of sections in such a manner that overlap portions between adjacent images are included so that the original composition is restored, said image synthesizing apparatus comprising:

first image correction means for performing a geometrical deforming process in accordance with estimated angles of view using a preliminarily set angle, such that position relationships of the adjacent images coincide with each other;

image view angle setting means for comparing pixel values in overlap sections of the adjacent images subjected to the geometrical deforming process, with each other, so as to reset an angle of view which has a highest correlation or a minimum sum of absolute values of differences as an angle of view used for said photographing;

second image correction means for performing at least once a geometrical deforming process in accordance with the estimated angles of view using the view angle set by the image view angle setting means, such that the position relationships of the adjacent images coincide with each other; and image synthesizing means for calculating a parallel translation distance and a rotational angle by detecting deviation of positions of a plurality of feature points in the overlap portions of the adjacent images subjected to the geometrical deforming process performed by the second image view angle correcting means, so as to perform interpolation and connect the divided images to each other.

* * * * *